United States Patent
Jiang et al.

(10) Patent No.: US 12,015,504 B1
(45) Date of Patent: Jun. 18, 2024

(54) COMPUTING DEVICE WITH A VIRTUAL NETWORK LAYER INSTALLED WITH USER PLANE FUNCTION (UPF) PLUGIN AND METHOD FOR PROCESSING UPF PACKET

(71) Applicant: Alpha Networks Inc., Hsinchu (TW)

(72) Inventors: Guan-Yi Jiang, Hsinchu (TW); Hsu-Tung Chien, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 0 days.

(21) Appl. No.: 18/343,434

(22) Filed: Jun. 28, 2023

(30) Foreign Application Priority Data

Dec. 20, 2022 (TW) .................................. 111148884

(51) Int. Cl.
  *G06F 15/16* (2006.01)
  *H04L 12/46* (2006.01)
  *H04L 69/22* (2022.01)

(52) U.S. Cl.
  CPC .......... *H04L 12/4641* (2013.01); *H04L 69/22* (2013.01)

(58) Field of Classification Search
  CPC .............. H04L 12/4641; H04L 69/22
  USPC .......................................................... 709/203
  See application file for complete search history.

(56) References Cited

U.S. PATENT DOCUMENTS

| | | | |
|---|---|---|---|
| 10,079,767 B2 * | 9/2018 | Bosch | H04L 67/568 |
| 10,701,600 B2 * | 6/2020 | Larsson | H04W 36/0077 |
| 10,728,145 B2 * | 7/2020 | Rao | H04L 41/0893 |
| 10,999,756 B2 * | 5/2021 | Bogineni | H04W 28/0268 |
| 11,026,166 B2 * | 6/2021 | Huang | H04W 8/08 |
| 11,153,229 B2 * | 10/2021 | Djukic | G06N 3/04 |
| 11,223,560 B2 * | 1/2022 | Thanneeru | H04L 12/2856 |
| 11,252,040 B2 * | 2/2022 | Boon | H04L 41/12 |
| 11,252,655 B1 * | 2/2022 | Gupta | G06F 8/63 |
| 11,281,606 B2 * | 3/2022 | Young | G06F 13/20 |
| 11,310,733 B1 * | 4/2022 | Gupta | H04W 28/16 |
| 11,375,024 B1 * | 6/2022 | Waters | H04L 47/20 |
| 11,418,955 B2 * | 8/2022 | Marinho | H04L 49/208 |
| 11,475,349 B2 * | 10/2022 | Guntuku | G06Q 10/04 |
| 11,483,733 B2 * | 10/2022 | Lee | H04L 45/04 |
| 11,490,450 B1 * | 11/2022 | Balmakhtar | H04L 69/08 |
| 11,522,803 B2 * | 12/2022 | Navrátil | H04L 43/16 |
| 11,528,725 B1 * | 12/2022 | Qureshi | H04W 16/14 |
| 11,546,793 B2 * | 1/2023 | Chunduri | H04W 28/0263 |
| 11,563,643 B2 * | 1/2023 | Boon | H04L 63/101 |
| 11,582,633 B2 * | 2/2023 | Bogineni | H04W 28/0263 |
| 11,601,348 B2 * | 3/2023 | Gupta | H04W 84/105 |

(Continued)

*Primary Examiner* — Alicia Baturay
(74) *Attorney, Agent, or Firm* — Blank Rome LLP

(57) ABSTRACT

A computing device includes a processing unit, a memory unit, a NIC that is for receiving a packet, and a network virtualization platform accommodating a plurality of virtual network applications. The NIC, the processing unit and the memory unit are collectively defined as a hardware layer for the network virtualization platform to operate thereon. The network virtualization platform includes a virtual network layer having a UPF plugin installed therewith. The UPF plugin performs rule matching according to a packet header of the packet, and determines which one of the following steps is to be performed: offloading the packet to one of the virtual network applications in the application layer for the virtual network application to provide services; and re-packaging the packet and forwarding the packet to the another computing device.

15 Claims, 7 Drawing Sheets

(56) References Cited

U.S. PATENT DOCUMENTS

| | | | |
|---|---|---|---|
| 11,601,818 B2* | 3/2023 | Surana | H04W 12/80 |
| 11,627,472 B2* | 4/2023 | Gupta | H04W 16/18 455/446 |
| 11,675,946 B1* | 6/2023 | Waters | H04L 67/14 703/23 |
| 11,683,698 B1* | 6/2023 | Qureshi | H04W 16/26 370/316 |
| 11,695,626 B2* | 7/2023 | Ha | H04L 43/045 709/221 |
| 11,698,874 B2* | 7/2023 | Young | H04L 67/55 710/6 |
| 11,711,727 B1* | 7/2023 | Gupta | H04W 76/11 370/329 |
| 11,711,759 B1* | 7/2023 | Gupta | H04L 45/64 370/235 |
| 11,737,166 B2* | 8/2023 | Balmakhtar | H04L 69/327 370/235 |
| 11,743,953 B2* | 8/2023 | Tamvada | H04W 76/25 370/329 |
| 11,763,215 B2* | 9/2023 | Guntuku | G06F 18/23213 706/45 |
| 11,777,595 B2* | 10/2023 | Holz | H04B 7/195 455/13.1 |
| 11,792,087 B1* | 10/2023 | Toy | H04L 41/40 709/224 |
| 11,812,265 B1* | 11/2023 | Gupta | H04W 12/0471 |
| 11,838,273 B2* | 12/2023 | Shevade | H04L 41/5067 |
| 11,871,240 B2* | 1/2024 | Gupta | G06Q 10/0833 |
| 11,871,284 B1* | 1/2024 | Edara | H04W 16/14 |
| 11,877,158 B2* | 1/2024 | Surana | H04W 12/80 |
| 11,886,315 B2* | 1/2024 | Gupta | H04L 67/10 |
| 11,888,701 B1* | 1/2024 | Liu | H04L 41/12 |
| 11,895,508 B1* | 2/2024 | Qureshi | B64C 39/024 |
| 11,943,704 B2* | 3/2024 | Huang | H04W 48/18 |
| 2021/0400537 A1* | 12/2021 | Zhang | H04L 47/28 |
| 2021/0409335 A1* | 12/2021 | Zhu | H04L 47/24 |
| 2022/0116334 A1* | 4/2022 | Zhu | H04W 76/15 |
| 2022/0124043 A1* | 4/2022 | Zhu | H04L 47/2475 |
| 2022/0124588 A1* | 4/2022 | Zhu | H04W 28/0236 |
| 2022/0150130 A1* | 5/2022 | Kuai | H04L 41/147 |
| 2022/0311837 A1* | 9/2022 | Gupta | G06F 21/577 |
| 2023/0107891 A1* | 4/2023 | Miriyala | G06F 9/5044 370/254 |
| 2023/0195489 A1* | 6/2023 | Lan | H04W 84/02 718/1 |
| 2024/0040472 A1* | 2/2024 | Satyanarayana | H04W 40/28 |

\* cited by examiner

COMPUTING DEVICE WITH A VIRTUAL NETWORK LAYER INSTALLED WITH USER PLANE FUNCTION (UPF) PLUGIN AND METHOD FOR PROCESSING UPF PACKET

CROSS-REFERENCE TO RELATED APPLICATION

This application claims priority to Taiwanese Invention Patent Application No. 111148884, filed on Dec. 20, 2022.

FIELD

The present disclosure relates to a method for processing a user layer function (UPF) packet and a computing device for implementing the method, more particularly to a method that is for processing a UPF packet and that is compatible with a virtual network layer.

BACKGROUND

The continuous development of mobile networks has brought about groundbreaking changes to traditional network infrastructure. For example, the fifth-generation technology standard (5G) has introduced the concept of Open Networking, which decouples and virtualizes network functions, and combined with Cloud Native technology, distributes the network functions in the form of microservice to edge nodes for edge computing. This approach can be more flexible and adaptable to different requirements and usage cases, and bring network functions closer to end users, thereby reducing latency and improving the overall user experience.

Decoupling and virtualizing network functions specifically includes dividing the core network into a user plane and a control layer, as shown in FIG. 1, and deploying a User Plane Function (UPF) 91 to an application layer 92 of a multi-access edge computing (MEC) server 90 based on the virtualization technology of a cloud native architecture, thereby providing computations and services proximate to the user terminal. For example, in the introductory webpage of Blue Arcus, Intel provides an introduction to UPF deployed at the application layer (see URL in https://networkbuilders.intel.com/commercial-applications/bluearcus-upf).

Under this architecture shown in FIG. 1, as a packet is being sent by a user equipment (UE) 81, the packet is transmitted via the Radio Access Network (RAN) 82 through GPRS Tunneling Protocol User Plane (GTP-U) tunnel to the MEC server 90, which further has a virtual network layer 901 that forwards the packet to the UPF 91 at the application layer 92. The UPF 91 decaps the packet, i.e., unpacks the GTP-U header, and performs match rules. In the case where the UPF 91 is a Protocol Data Unit (PDU) session anchor, the packet is returned to the virtual network layer 901, the virtual network layer 901 again offloads the packet to one of applications (APPs) in the application layer 92 to provide services (dataflow indicated by an arrow A in FIG. 1). In the case where the UPF 91 is not a session anchor, the UPF 91 repackages the GTP-U header and forwards the package to another MEC server 90' through the MEC server 90 (dataflow indicated by an arrow B in FIG. 1). For details, please refer to ETSI TS 123 502 v16.5.0 entitled "5G; Procedures for the 5G System (5GS)(3GPP TS 23.502 version 16.5.0 release 16)" issued in July 2020 by the European Telecommunications Standards Institute (ETSI).

However, in such a process, the packet would be transmitted between the virtual network layer 901 and the application layer 92 of the MEC server 90 a number of times, resulting in a serious delay issue. In detail, the virtual network layer 901 is implemented by software such as a bridge, an iptable, etc., and cooperates with APPs to provide specific services. With this architecture, the packets are transmitted between the virtual network layer 901 and the application layer 92 during processing, resulting in additional processing with respect to routing policies. Since computational processing is performed by the central processing unit (CPU) of the MEC server 90, packet processing not only has serious latency problems, but also occupies the normal basic computing resources of the CPU. Overall, the service operation is delayed, and the demand for high-speed transmission and low latency can hardly be met.

SUMMARY

Therefore, an object of the disclosure is to provide a computing device with a virtual network layer installed with a user plane function (UPF) plugin that can alleviate at least one of the drawbacks of the prior art.

According to the disclosure, the computing device receives a packet from a user equipment (UE) and communicates with another computing device. The computing device includes a processing unit, a memory unit that is connected to the processing unit, a network interface card (NIC) that is connected with the processing unit and the memory unit and that is for receiving the packet, and a network virtualization platform.

The NIC, the processing unit and the memory unit are collectively defined as a hardware layer. The network virtualization platform operates on the hardware layer, and is configured to be performed by the processing unit to accommodate a plurality of virtual network applications. The network virtualization platform includes an application layer having the virtual network applications deployed thereon, and a virtual network layer having a user plane function (UPF) plugin installed therewith.

The UPF plugin is configured to perform rule matching according to a packet header of the packet, and to determine which one of the following steps is to be performed: offloading the packet to one of the virtual network applications in the application layer for the virtual network application to provide services; and re-packaging the packet and forwarding the packet to the another computing device.

Another object of the disclosure is to provide a method for processing a UPF packet that can alleviate at least one of the drawbacks of the prior art.

According to the disclosure, the method is executed by a computing device. The computing device includes a processing unit, a memory unit and a network interface card (NIC) that are connected to each other and that are collectively defined as a hardware layer. The computing device further includes a network virtualization platform that operates on the hardware layer and that is configured to be performed by the processing unit to accommodate a plurality of virtual network applications. The network virtualization platform includes an application layer that has the virtual network applications deployed thereon, and a virtual network layer that has a user plane function (UPF) plugin installed therein. The UPF plugin communicates with another computing device. The method includes the following steps.

In a step, the NIC receives a packet from a UE.

In another step, the UPF plugin performs rule matching according to a packet header of the packet and determines which one of the following steps is to be performed: offloading the packet to one of the virtual network applications in the application layer for the virtual network application to provide services, and re-packaging the packet and forwarding the packet to the another computing device.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
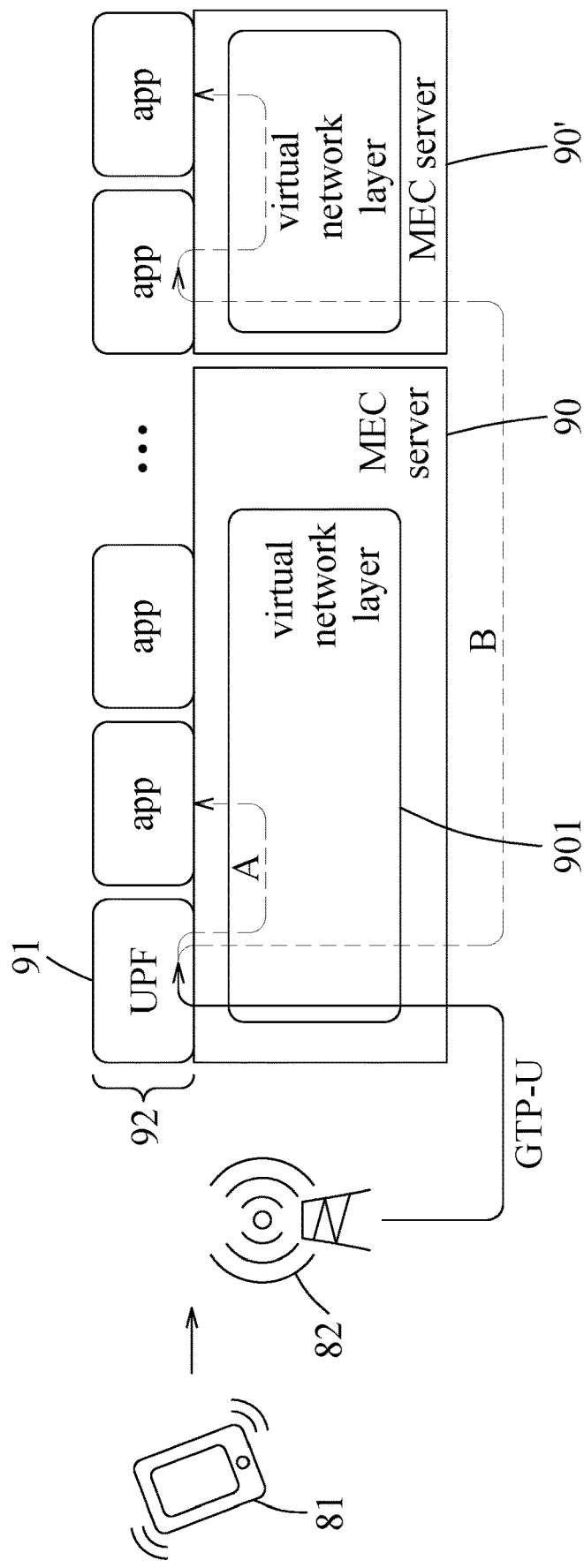
FIG. 1 is a block diagram illustrating a conventional architecture of a UPF deployed to an application layer of a MEC server.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
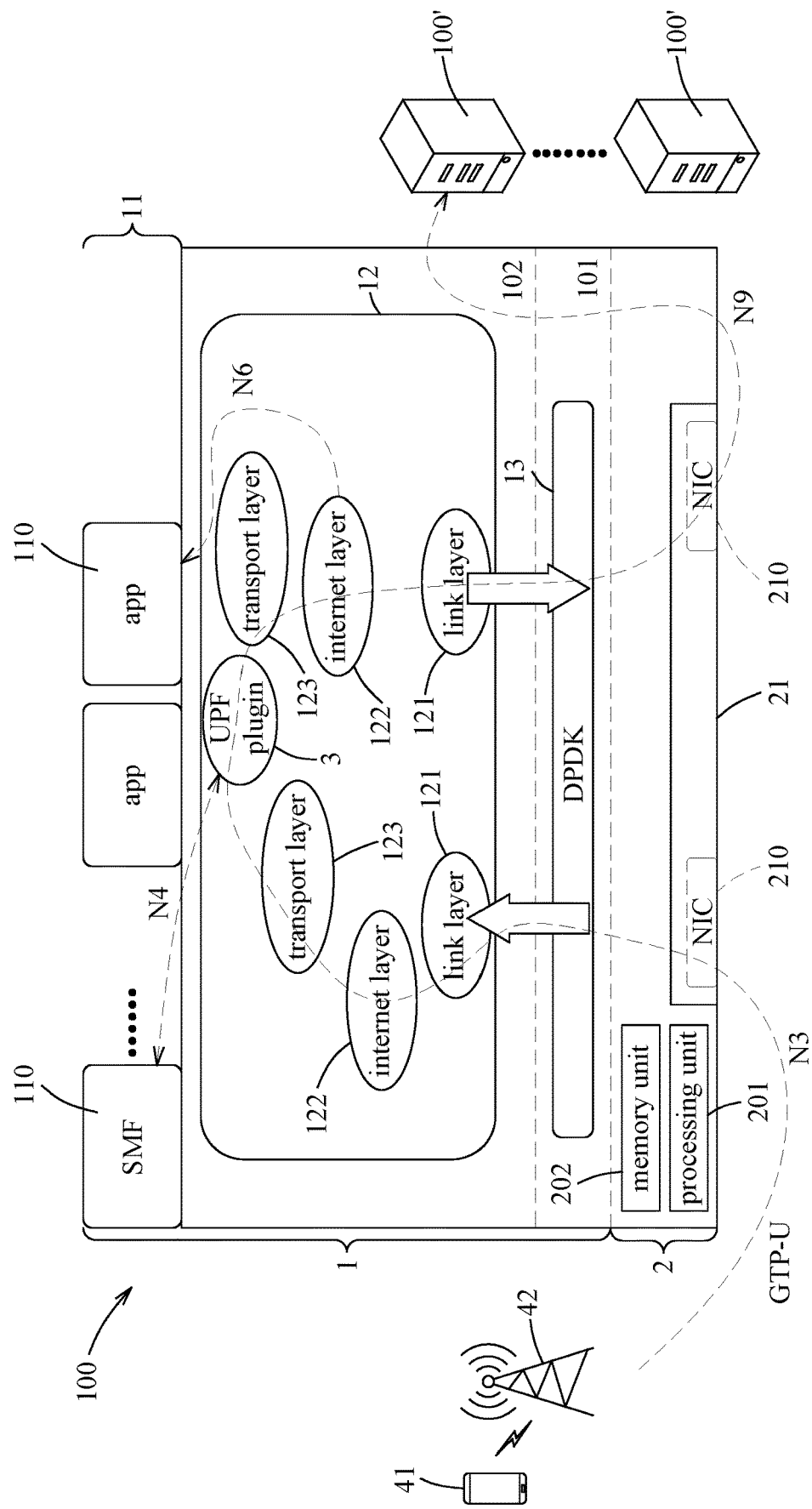
FIG. 2 is a block diagram illustrating an architecture of a computing device having a virtual network layer with a UPF plugin according to an embodiment of the present disclosure.

Referring to FIG. 2, an embodiment of a computing device 100 of this disclosure is configured to be deployed as an edge computing node in a 5G network. The computing device 100 has a virtual network layer 12 installed with a user plane function (UPF) plugin 3. The computing device 100 is, for example, a multi-access edge computing (MEC) server in compliance with the standards developed by the 3rd Generation Partnership Project (3GPP) standard and/or the European Telecommunications Standards Institute (ETSI), but is not limited thereto, and may be any computer supporting virtual network technologies.

In the present embodiment, the computing device 100 has a plurality of physical hardware components connected to each other. The physical hardware components include a processing unit 201, a memory unit 202 storing program instructions, and a network interface card (NIC), which are collectively defined as a hardware layer 2 of the computing device 100. The hardware layer 2 provides an operating environment for a network virtualization platform 1 of the computing device 100. The processing unit 201 may be a central processing unit (CPU), or implemented by firmware and/or hardware such as a micro processor or a system on chip, etc., and may utilize a single device or distributed devices to perform functions. The memory unit 202 may be one or more computer-readable media, and may be memory in various forms, such as random access memory (RAM), read-only memory, flash memory, fixed or removable storage media, etc., which may be used to store code and data in the form of instructions or data structures for access by the processing unit 201.

In this embodiment, the NIC is a general network interface card (hereinafter referred to as NIC 21). The NIC 21 is configured to provide one or more virtual input/output (I/O) interfaces 210 to exchange packets. In FIG. 2, two virtual I/O interfaces 210 are shown as examples for packet reception and transmission, respectively. In the present embodiment, the NIC 21 receives the packets that are outputted by a user equipment (UE) 41 and transmitted over a wireless access network (e.g., a radio access network (RAN)) 42 through a GPRS Tunneling Protocol User Plane (GTP-U) tunnel. Upon processing the packets, the computing device 100 offloads the packets and provides the service, or otherwise forwards the packets to the next node (described in detail below). It should be noted that the type of the NIC 21 is not limited to that mentioned in the present disclosure, and may be a field-programmable gate array (FPGA), or may be a smart network interface card (hereinafter referred to as a Smart NIC) in other embodiments, such as that shown in FIG. 4.

The network virtualization platform 1 is configured to be performed by the processing unit 201 to accommodate a plurality of independent virtual network applications 110. Examples of the virtual network applications 110 include various microservice applications, Session Management Functions (SMF), and applications (APPs) that provide functions similar to hardware devices, such as virtual routers, firewalls, and intrusion prevention systems. SMF is used to establish a new Protocol Data Unit (PDU) session or alter an established PDU session for UPF through an N4 interface.

Specifically, the network virtualization platform 1 includes an application layer 11 having the virtual network applications 110 deployed thereon, and the virtual network layer 12 having the UPF plugin 3 installed therein. In this embodiment, the virtual network layer 12 refers to a network layer deployed based on a virtualization technology of a cloud native architecture. In this embodiment, the virtual network layer 12 of the network virtualization platform 1 is implemented by vector packet processing (VPP), but is not limited thereto, and may also be other software development kit (SDK) such as 6WINDGate provided by 6WIND.

UPF is one of the basic components of infrastructure architectures in the 3GPP 5G core network, and will be decoupled and deployed to the edge computation node. In the present embodiment, the UPF is programmed as a modular plugin (i.e., the UPF plugin 3) under a VPP Packet Processing Graph architecture, and is installed on the virtual network layer 12 in the form of a plugin. The UPF plugin 3 can be executed and interspersed into the packet processing flow of original functions of the virtual network layer 12, thereby enabling extended functionality and operational flexibility without affecting the original functions of the virtual network layer 12. For example, the packet processing flow is illustrated by a dashed arrow in FIG. 2. The original functions of the virtual network layer 12 are the functions of the layers of the Open System Interconnection Model (OSI model), such as link layers 121, internet layers 122, and transport layers 123, etc. The UPF plugin 3 has ability to process packets of the 3GPP interfaces, such as N3, N4, N6, N9, N11, N19, S5-U, and S2B-U interfaces. The UPF plugin 3 communicates with another computing device 100' via the N9 interface of the 5G standard specified in 3GPP. As per the 5G standard specified in 3GPP, the N9 interface is an interface between two UPFs. The aforementioned 3GPP specification and the standards are not features of the present disclosure and will not be described herein. The specific functions of the UPF plugin 3 are detailed below.

The network virtualization platform 1 may be divided into a kernel space 101 and a user space 102 according to levels of the authority of the operating system of the computing device 100. Kernel processes relating to privileged instructions (e.g., instructions from a device driver 13, etc.) are run in the kernel space 101. As for the user space 102, it is used for unprivileged processing. Both the application layer 11 and the virtual network layer 12 run in the user space 102. In this embodiment, the device driver 13 uses uio_generic_pci, virtio, or igb_uio supported by Data Plane Development Kit (DPDK), but not limited thereto.

Figure 3:
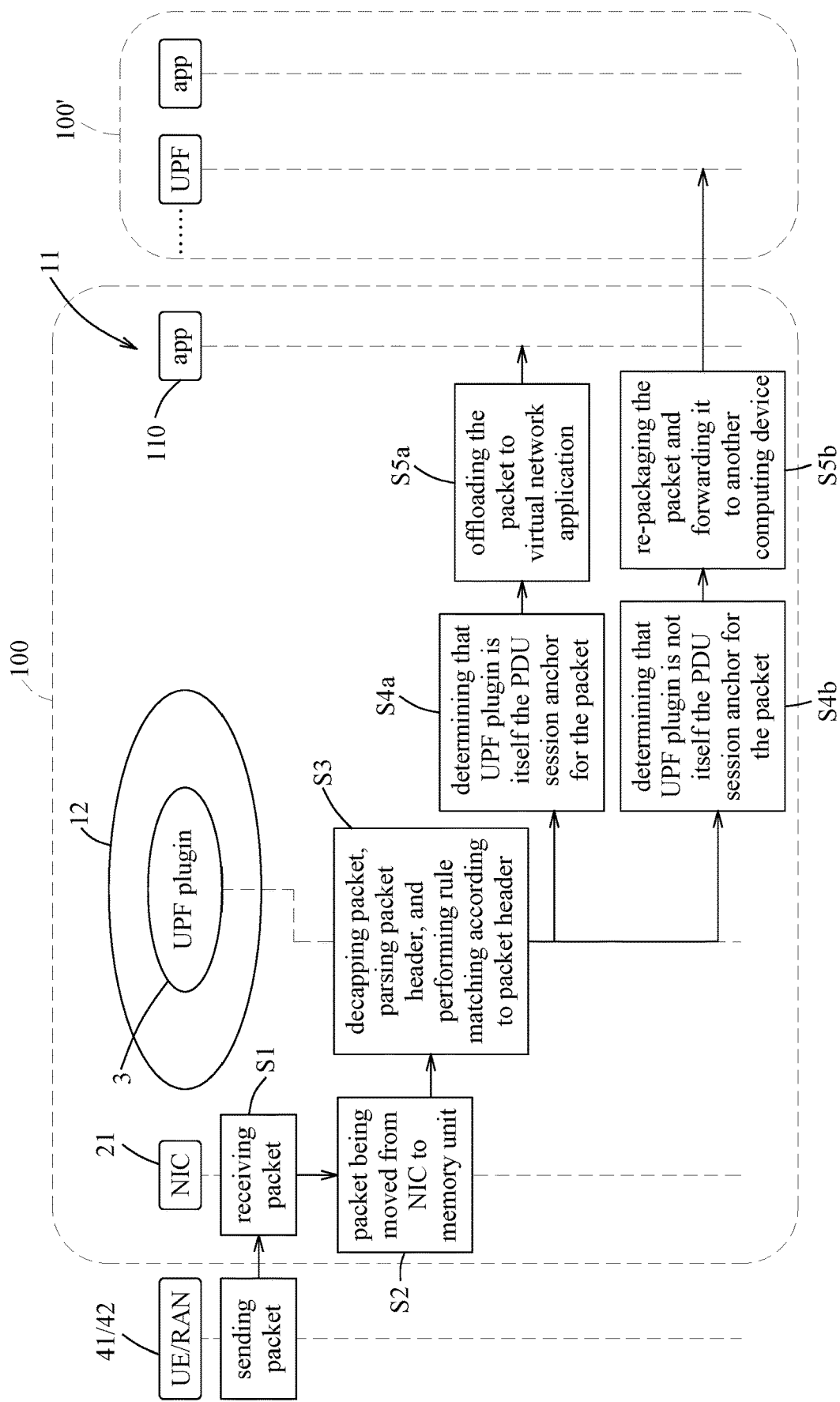
FIG. 3 is a flow chart illustrating a method for processing a UPF packet according to an embodiment of the present disclosure.

Further referring to FIG. 3, a method for processing a UPF packet is executed by the computing device 100 of the present embodiment, and includes the following steps.

When the UE 41 sends a packet, the packet is received, via the RAN 42, by the NIC 21 through the N3 interface of GTP-U (step S1). In accordance with the 5G standard specified by 3GPP, the N3 interface refers to the interface between the RAN 42 and the UPF.

In step S2, the packet is moved from the NIC 21 to the memory unit 202 by the device driver 13 using a zero-copy technique in order for the virtual network layer 12 to directly read the packet from the memory unit 202. In a specific embodiment, the device driver 13 is supported by a Data Plane Development Kit (DPDK), allowing packets to be transmitted directly to the user space 102 by polling. In other specific embodiments, the device driver 13 is a software development kit (SDK) such as eXpress Data Path (XDP), which allows transmission of the packet without interrupting the processing unit 201 in order to replicate the packet, and the packet does not need to be exchanged between the user space 102 and the kernel space 101 and is transmitted directly from the NIC 21 to the user space 102. In this way, kernel bypass is realized and flow of data from the physical network to the virtual network is relatively fast, resulting in accelerated packet processing speed.

In step S3, the UPF plugin 3 decaps the packet, parses a packet header of the packet, and performs rule matching according to the packet header. With respect to rule matching, the UPF plugin 3 determines a PDU session anchor according to the requirement of the UE 41 recorded in the packet in order to determine which one of step S4a and step S4b is to be performed. Specifically, the packet records a target microservice application or a local area data network (LADN) required by the UE 41, which is the basis for the UPF plugin 3 to determine the PDU session anchor. In the case where the UPF plugin 3 determines that it is itself the PDU session anchor for the packet (step S4a), the flow of the method proceeds to step S5a to offload the packet through the N6 interface to the designated virtual network application 110 in the application layer 11 for the virtual network application 110 to provide services. In the case where the UPF plugin 3 determines that it is not itself the PDU session anchor but the branch point (step S4b), the flow of the method proceeds to step S5b to re-package the packet and forward the packet to another computing device 100' through the N9 interface (interfaces between two UPFs).

From the above, by installing the UPF as a plugin in the virtual network layer 12 and by kernel bypass, packet forwarding between the application layer 11 and the virtual network layer 12 is avoided, thereby accelerating packet processing.

Figure 4:
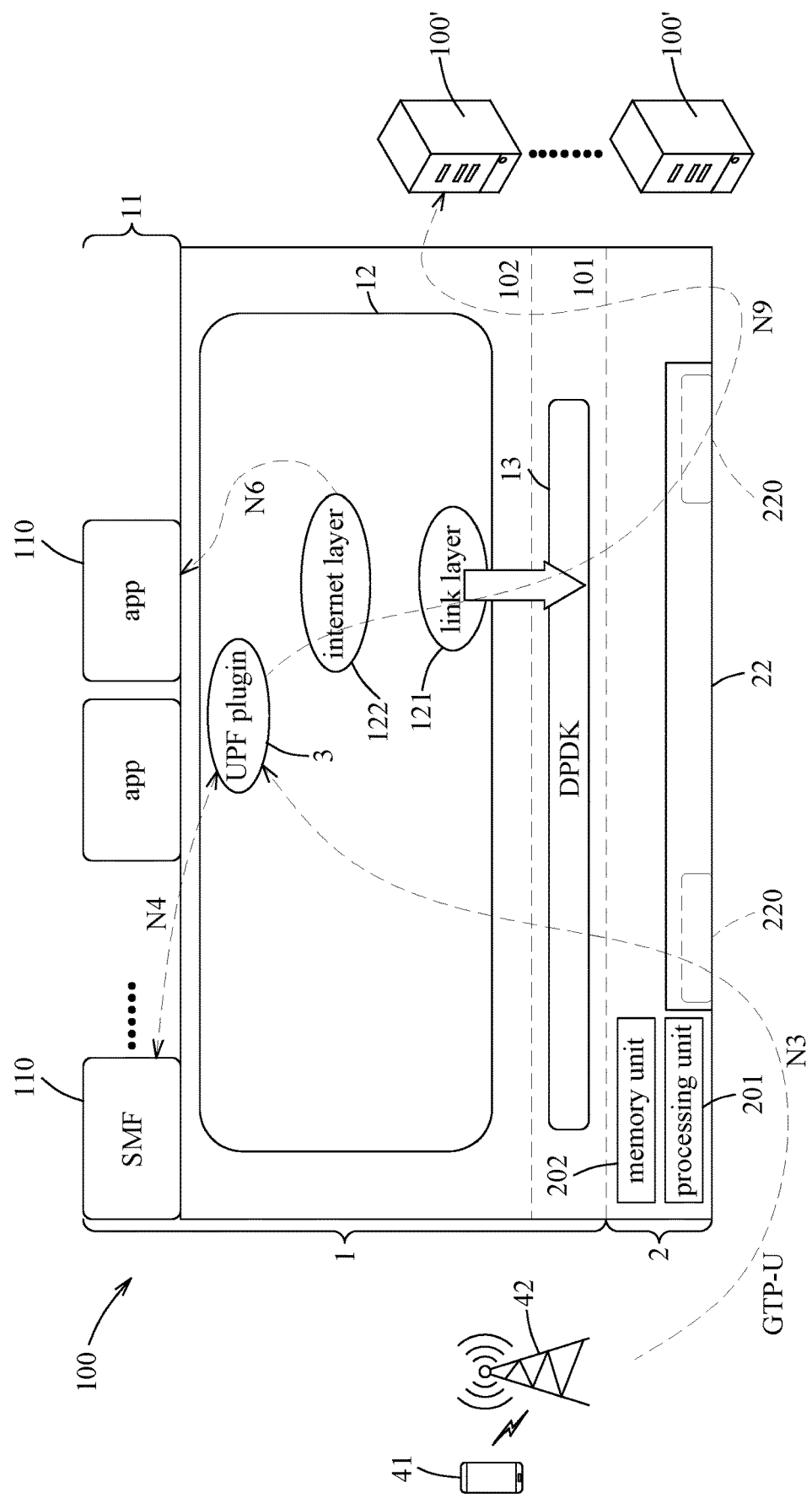
FIG. 4 is a block diagram illustrating another architecture of a computing device having a virtual network layer with a UPF plugin according to another embodiment of the disclosure.

Furthermore, by modularizing the UPF into a plugin, higher compatibility and flexibility of operation are achieved for various computing devices that use different hardware resources or different virtual network layers. Referring to FIG. 4, in another embodiment of the disclosure, the NIC of the computing device 100 is a smart network card 22 that supports a hardware offload function. The smart network card 22 supports some of the packet processing that was originally done on the virtual network layer 12 and the UPF plugin 3. The smart network card 22 is configured to provide one or more virtual input/output (I/O) interfaces 220 to exchange packets.

Figure 5:
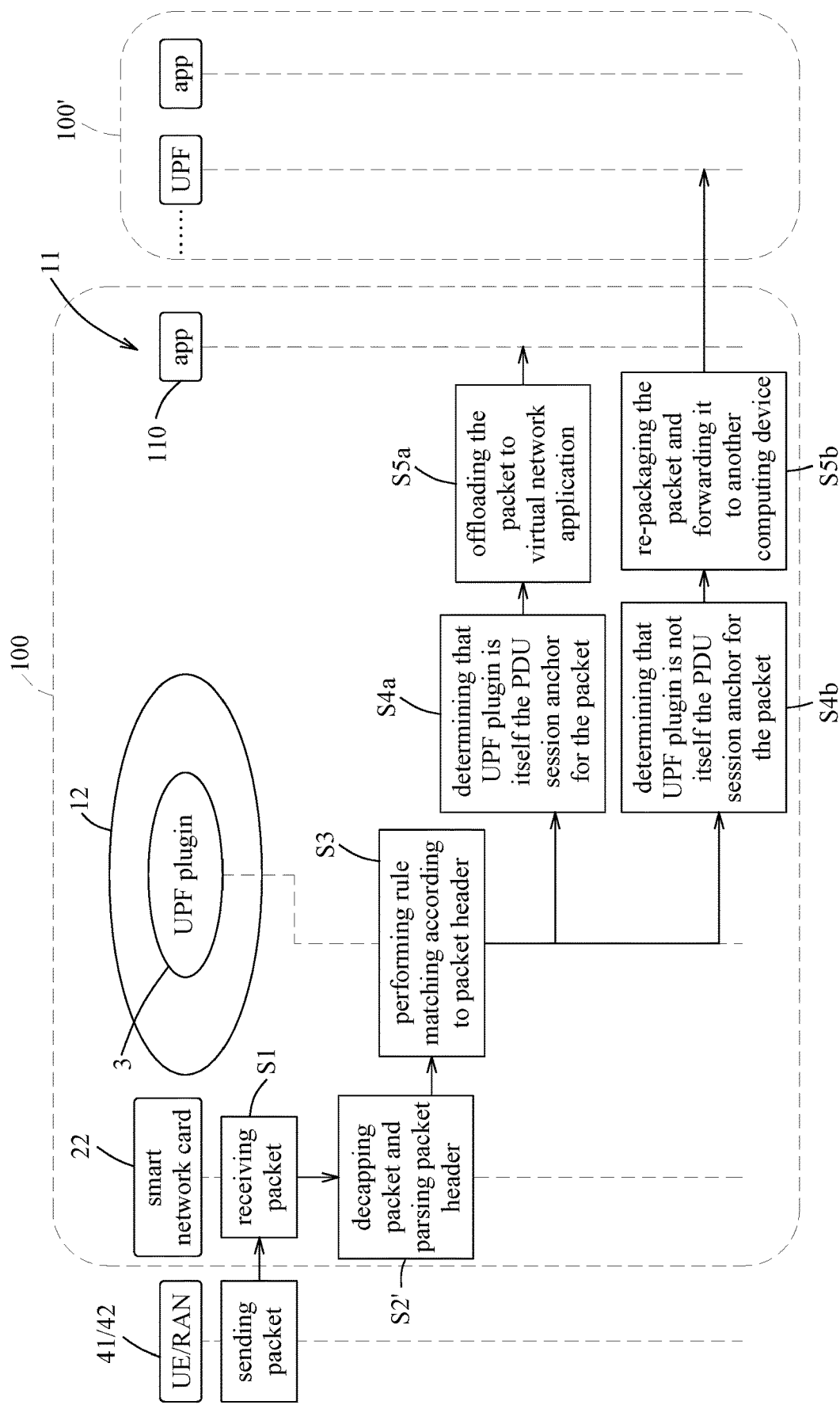
FIG. 5 is a flow chart illustrating the method for processing a UPF packet according to another embodiment of the disclosure.

Further referring to FIG. 5, in this embodiment, the method for processing a UPF packet is executed by the computing device 100 shown in FIG. 4, and is similar to the method of FIG. 3, except steps S2' and S3'. In step S2', the smart network card 22 directly decaps the received packet and parses the packet header, and then transmits the decapped packet to the UPF plugin 3 through the virtual network layer 12. In step S3', since the packet has been decapped and the header has been parsed, the UPF plugin 3 performs rule matching on the packet directly. The UPF plugin 3 then proceeds to steps S4a, S5a or steps S4b, S5b depending on the matching result. With the support of the smart network card 22, the computing resources of the processing unit 201 and the memory unit 202 of the computing device 100 can be further saved, and the packet processing latency can be reduced.

Figure 6:
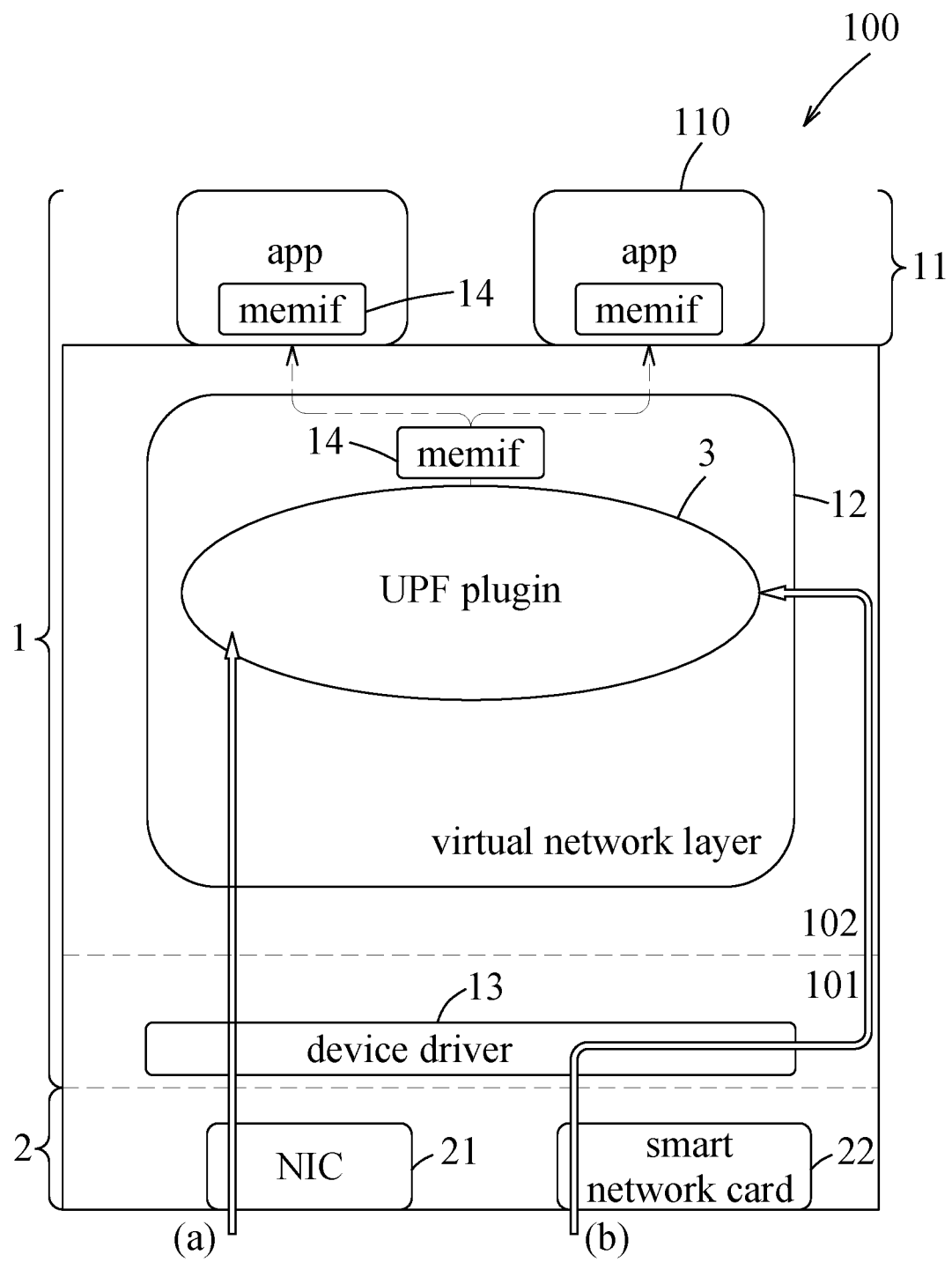
FIG. 6 is a block diagram illustrating another architecture of a computing device having a virtual network layer with a UPF plugin according to another embodiment of this disclosure.
Figure 7:
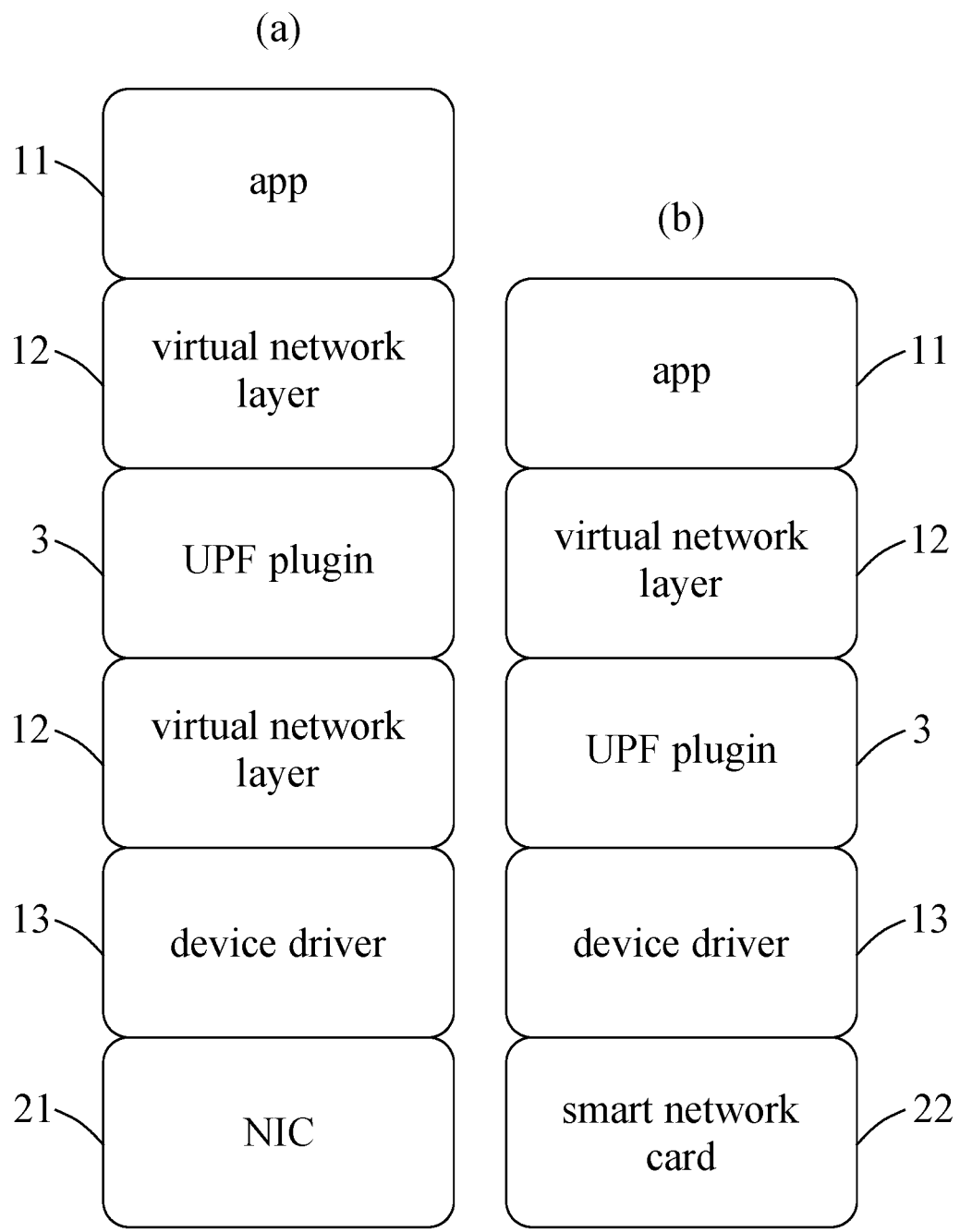
FIG. 7 is a schematic diagram illustrating software/hardware through which packets are processed.

As a conclusion, the architecture of the UPF plugin 3 of the present disclosure can be adapted to various software and hardware configurations of different computing devices 100. Referring to FIGS. 6 and 7, in the case where the computing device 100 adopts a universal NIC (i.e., the NIC 21 in FIG. 2), the packet process flow is shown as arrow (a) in FIG. 6, i.e., from the NIC 21, through the device driver 13, into the virtual network layer 12 of the user space 102, and then to the UPF plugin 3. Finally, the packet may be offloaded to the application layer 11 depending on the rule matching result. In the case where the NIC of the computing device 100 is a smart network card 22 (see FIG. 4), the packet process flow is as shown by arrow (b) in FIG. 6, from the smart network card 22, through the device driver 13, and then directly to the UPF plugin 3, and then the packet may be offloaded to the application layer 11 depending on the rule matching result.

The network virtualization platform 1 can provide a unified management interface for virtual machine and container application services, while supporting the infrastructure solutions of OpenStack NFV (OPNFV) and Kubernetes, etc. The virtual network applications 110 may be containers, virtual machines, and as a result, it is easier to quickly deploy various virtual network applications 110. In detail, each virtual network application 110 may be a container that is managed by the virtual network layer 12 using tools such as Kubernetes or Docker. Each virtual network application 110 may also be a virtual machine that is managed by the virtual network layer 12 using tools such as VMware vSphere Hypervisor (ESXi), OpenStack or Hyper-V, etc.

In addition, the virtual network applications 110 share the memory unit 202 by means of shared memory packet interfaces (memif) 14. The memif 14 serves as an interface between the virtual network applications 110 and the virtual network layer 12, and allows the packets to be transmitted directly in the virtual network layer 12. In this way, flow of data between the virtual network layer 12 and a local data network is accelerated without passing through the kernel space 101, thereby significantly reducing the time for UE registration, PDU session establishment, etc., so as to achieve the purpose of accelerating packet processing.

In summary, by having the UPF deployed in the virtual network layer 12, as opposed to the application layer 11, the packets are transmitted back and forth less often. Since the UPF is deployed in the virtual network layer 12 in a plugin manner, it does not affect the original architecture of the virtual network layer 12 and makes the deployment more flexible and expandable. In addition, in the present disclosure, accelerated tools such as DPDK and XDP are used to improve the efficiency of packet processing and to speed up the flow of data between the physical network and the virtual network by bypassing the kernel. Furthermore, flow of data between the virtual network applications 110 and the virtual network layer 12 is accelerated by means of the memif interfaces. The above features certainly achieve the object of the disclosure.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A computing device for receiving a packet from a user equipment (UE) and communicating with another computing device, the computing device comprising:
    a processing unit;
    a memory unit that is connected to the processing unit;
    a network interface card (NIC) that is connected with the processing unit and the memory unit and that is for receiving the packet, the NIC, the processing unit and the memory unit being collectively defined as a hardware layer; and
    a network virtualization platform that operates on the hardware layer, that is configured to be performed by the processing unit to accommodate a plurality of virtual network applications, and that includes
        an application layer having the virtual network applications deployed thereon, and
        a virtual network layer having a user plane function (UPF) plugin installed therewith, the UPF plugin being configured to perform rule matching according to a packet header of the packet, and to determine which one of the following steps is to be performed:
    offloading the packet to one of the virtual network applications in the application layer for the virtual network application to provide services; and
    re-packaging the packet and forwarding the packet to the another computing device.

2. The computing device as claimed in claim 1, wherein the UPF plugin is configured to determine which one of the step of offloading and the step of re-packaging is to be performed based on a Protocol Data Unit (PDU) session anchor, which is determined according to the requirement of the UE recorded in the packet,
    in the case where the UPF plugin determines that it is itself the PDU session anchor for the packet, the step of offloading is performed, and
    in the case where the UPF plugin determines that it is not itself the PDU session anchor, the step of re-packaging is performed.

3. The computing device as claimed in claim 2, wherein the UPF plugin is configured to decap the packet, parse the packet header of the packet, perform rule matching according to the packet header, and determine the PDU session anchor according to the requirement of the UE recorded in the packet.

4. The computing device as claimed in claim 2, wherein the NIC is a smart network card that supports a hardware offload function, the smart network card directly decaps the packet that is received and parses the packet header, and then transmits the decapped packet to the UPF plugin, and the UPF plugin is configured to perform rule matching on the packet according to the packet header of the packet, and determine the PDU session anchor according to the requirement of the UE recorded in the packet.

5. The computing device as claimed in claim 1, wherein the packet is moved from the NIC to the memory unit by a device driver using a zero-copy technique.

6. The computing device as claimed in claim 5, wherein the network virtualization platform is divided into a kernel space and a user space according to levels of authority of an operating system of the computing device, the device driver runs in the kernel space, and the application layer and the virtual network layer run in the user space.

7. The computing device as claimed in claim 6, wherein the device driver is supported by Data Plane Development Kit (DPDK), allowing the packet to be transmitted directly to the user space by polling.

8. The computing device as claimed in claim 1, wherein the virtual network applications share the memory unit by means of shared memory packet interfaces (memif).

9. The computing device as claimed in claim 1, wherein the virtual network layer of the network virtualization platform is implemented by vector packet processing (VPP), and the UPF plugin is programmed as a modular plugin under a VPP Packet Processing Graph architecture.

10. The computing device as claimed in claim 1, wherein the UPF plugin communicates with the another computing device via interfaces of 5G standard specified in 3GPP.

11. A method for processing a UPF packet to be executed by a computing device, the computing device including a processing unit, a memory unit and a network interface card (NIC) that are connected to each other and that are collectively defined as a hardware layer, the computing device further including a network virtualization platform that operates on the hardware layer and that is configured to be performed by the processing unit to accommodate a plurality of virtual network applications, the network virtualization platform including an application layer that has the virtual network applications deployed thereon, and a virtual network layer that has a user plane function (UPF) plugin installed therein, the UPF plugin communicating with another computing device, the method comprising steps of:
  receiving, by the NIC, a packet from a UE;
  the UPF plugin performing rule matching according to a packet header of the packet and determining which one of the following steps is to be performed:
    offloading the packet to one of the virtual network applications in the application layer for the virtual network application to provide services, and
    re-packaging the packet and forwarding the packet to the another computing device.

12. The method as claimed in claim 11, wherein the UPF plugin determines which one of the step of offloading and the step of re-packaging is to be performed based on a Protocol Data Unit (PDU) session anchor, which is determined according to the requirement of the UE recorded in the packet:
  in the case where the UPF plugin determines that it is itself the PDU session anchor for the packet, the step of offloading is performed, and
  in the case where the UPF plugin determines that it is not itself the PDU session anchor, the step of re-packaging is performed.

13. The method as claimed in claim 12, further comprising steps performed by the UPF plugin after receiving the packet of:
  decapping the packet;
  parsing the packet header of the packet;
  performing rule matching according to the packet header; and
  determining the PDU session anchor according to the requirement of the UE recorded in the packet.

14. The method as claimed in claim 12, the NIC being a smart network card that supports a hardware offload function, the method further comprising steps, after receiving the packet, of:
  by the smart network card, decapping the packet that is received;
  by the smart network card, parsing the packet header;
  by the smart network card, transmitting the decapped packet to the UPF plugin via the virtual network layer; and
  by the UPF plugin, performing rule matching on the packet according to the packet header of the packet, and determining the PDU session anchor according to the requirement of the UE recorded in the packet.

15. The method as claimed in claim 11, further comprising a step, after receiving the packet, of:
  by a device driver, moving the packet from the NIC to the memory unit using a zero-copy technique.

* * * * *